No. 734,044. PATENTED JULY 21, 1903.
J. L. CANTELO.
TYPE WRITING MACHINE.
APPLICATION FILED JULY 15, 1902.
NO MODEL. 5 SHEETS—SHEET 1.

Fig. 1.

WITNESSES
INVENTOR

Fig. 2.

No. 734,044. PATENTED JULY 21, 1903.
J. L. CANTELO.
TYPE WRITING MACHINE.
APPLICATION FILED JULY 15, 1902.
NO MODEL. 5 SHEETS—SHEET 3.

WITNESSES
INVENTOR
J. L. Cantelo
By P. T. Dodge Atty

THE NORRIS PETERS CO., PHOTO-LITHO., WASHINGTON, D. C.

No. 734,044. Patented July 21, 1903.

UNITED STATES PATENT OFFICE.

JOHN L. CANTELO, OF LIVERPOOL, ENGLAND.

TYPE-WRITING MACHINE.

SPECIFICATION forming part of Letters Patent No. 734,044, dated July 21, 1903.

Application filed July 15, 1902. Serial No. 115,657. (No model.)

*To all whom it may concern:*

Be it known that I, JOHN LOUIS CANTELO, a subject of the King of Great Britain, residing in Liverpool, in the county of Lancaster, England, have invented certain new and useful Improvements in Type-Writing Machines, of which the following is a specification.

The improvements which are embodied in the devices herein described have reference chiefly to keyboard-machines of the class wherein motion is given to the whole body of type characters when any one of them is brought to the printing position, my invention having as its object the production of a useful and compact type-writer of pleasing form, offering a clear view of the writing in progress and having fewer parts than are usually required in machines of equal capability.

The type characters are borne by a tubular sleeve and are arranged in three fields, each consisting of three columns of type, a shift from one field to another being made by turning the sleeve. The type-sleeve is thrust endwise by a driving-arm, is caused to rotate by a column-selecting device, and is swung bodily downward by impressing mechanism, all these movements coöperating in such manner that any character of the field in use may be selected, brought into position, and printed by depressing a related key-lever.

In the accompanying drawings, which set forth the details of my invention.

In the drawings, A represents a casting, which forms the main frame of my machine and is supported in a usual manner by feet $a\ a$. A rod $a^2$, Figs. 2 and 4, serves as fulcrum for type-controlling levers B B and B' B', a universal impression-bail C, and space-making lever X. Sidewise displacement of the levers is prevented by passing them through kerfs $a^4\ a^4$, cut in the frame-casting, and springs $b^2\ b^2$ raise them against a somewhat elastic back-stop $b^3$—made, for instance, of rubber, leather, or the like. Side pieces $c'\ c'$ and a middle piece $c$, all rigidly connected by a transverse rod $c^2$, make up the universal bail, which is kept in position laterally by extending its side pieces into kerfs $c^4\ c^4$, Fig. 2.

Figures 3, 13, 14:
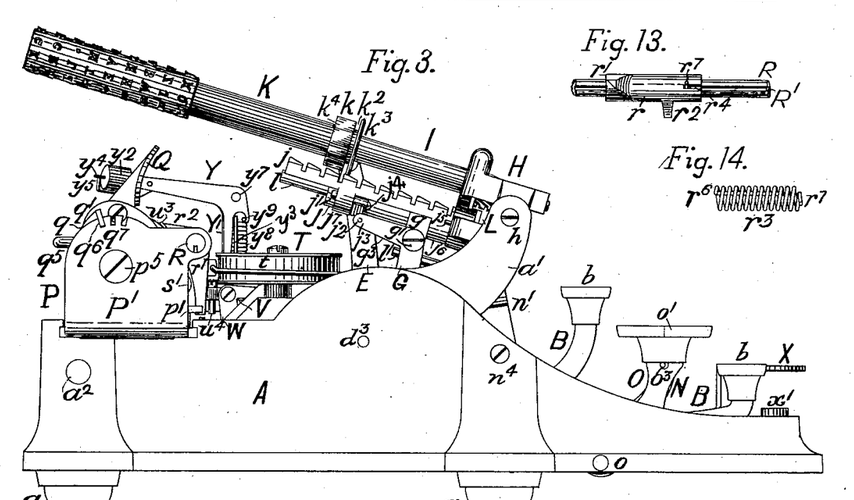
Fig. 3 is an end view of the complete machine.
Figs. 13 and 14 relate to mechanism for regulating the width of paper margins.
Figures 4, 8:
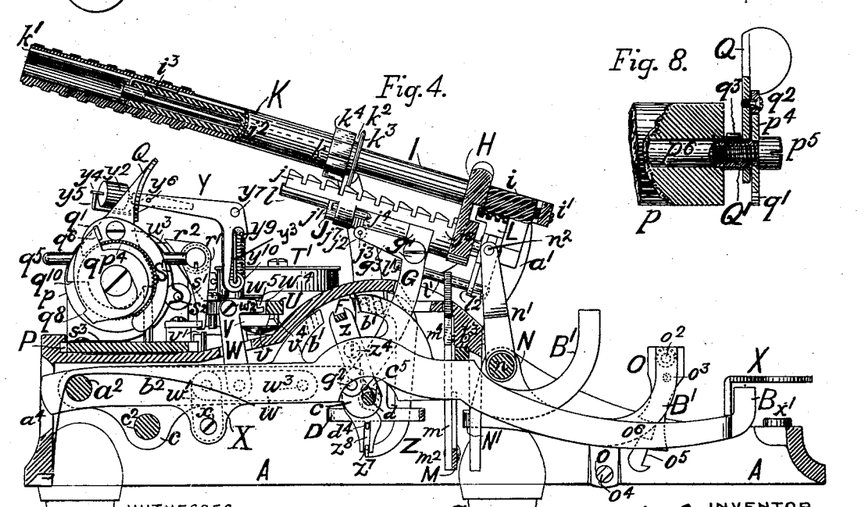
Fig. 4 is a vertical section showing the spacing-lever and parts beyond on the right-hand side of it, the carriage being pushed back and its end removed.
Fig. 8 shows means of attaching line-space mechanism to paper-platen.
Figures 5, 6, 7:
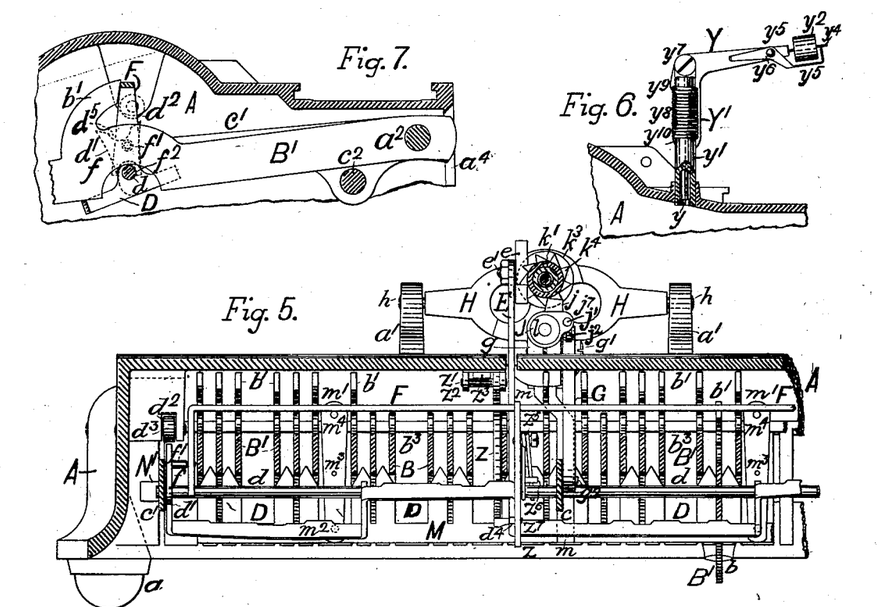
Fig. 5 is a partial sectional elevation looking from the rear with a key-lever pressed down to impress the type character $c$ at the printing-point.
Fig. 6 shows details of the inking mechanism.
Fig. 7 shows means of limiting endwise movement of the type-sleeve.

The type-sleeve K, Figs. 3 and 4, is capable of rotary and endwise movement upon a tubular arm I, which projects backwardly over a paper-carriage P from a trunnioned base H, pivoted by screws $h\ h$, Fig. 5, between main lugs $a'\ a'$, belonging to frame-casting A. A longitudinal groove $k'$ is formed within type-sleeve K to receive a tongue $i^3$, fixed at the backward end of a rod $i^2$, passing through the tubular arm I, as shown in Fig. 4. Upon the forward end of rod $i^2$ is fixed a pinion $i$, having helical teeth, which gears with a segment L, correspondingly toothed. The segment L is attached to the forward end of a rod $l$, capable of rotary and lengthwise movement within a tubular arm J, carried by the trunnioned base H below and parallel with impression-arm I. An impression-link G connects the lower tubular arm J with middle piece $c$ of the universal bail.

Figure 1:
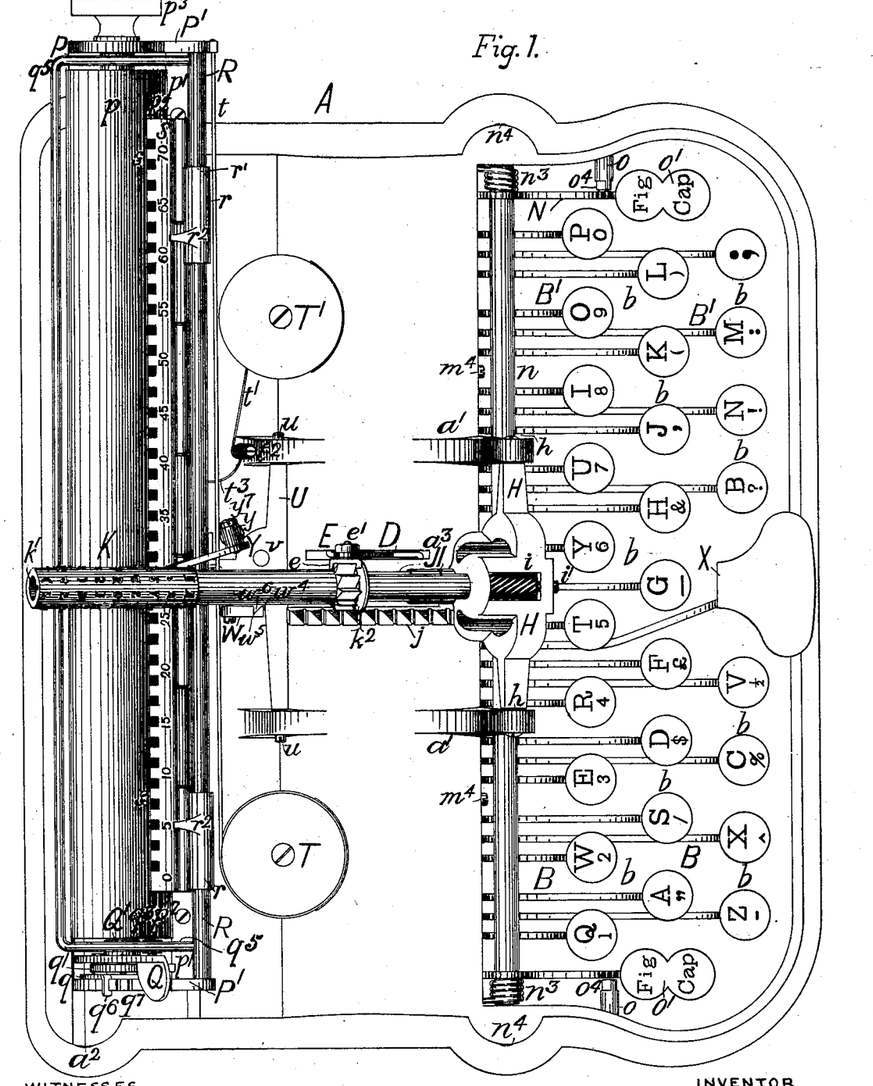
Figure 1 is a plan view of the machine.
Figure 2:
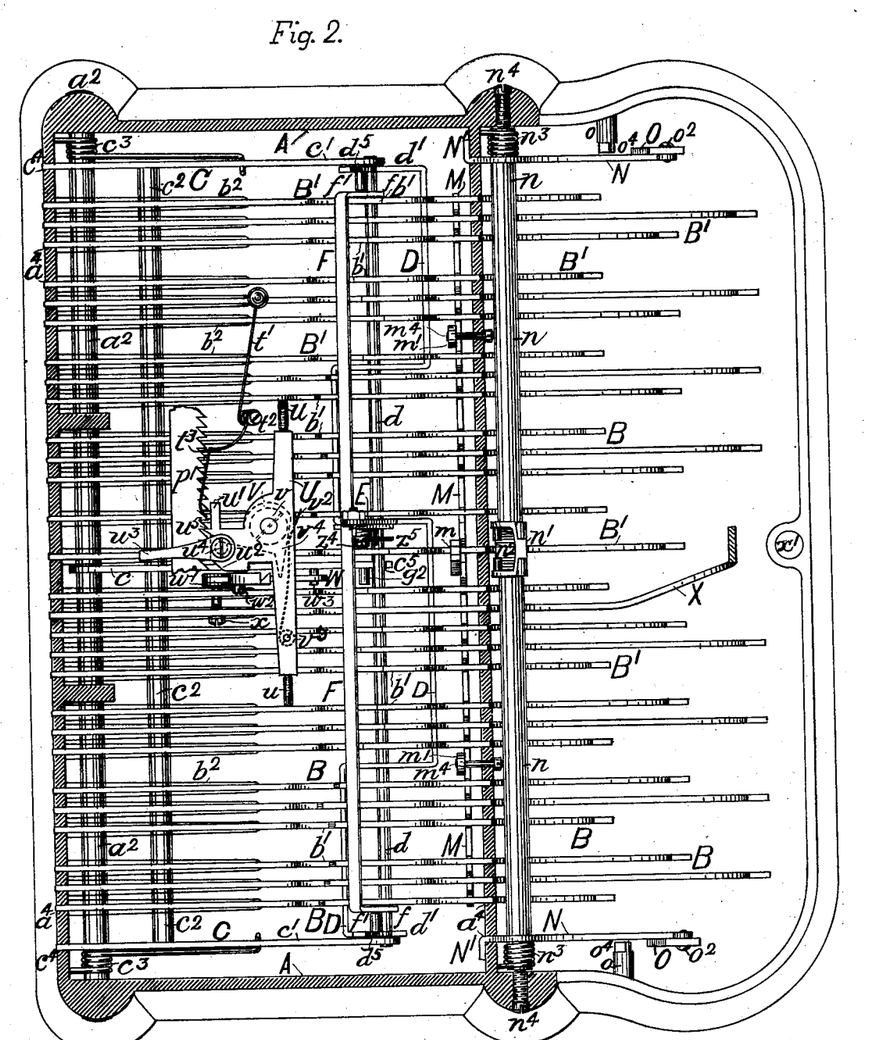
Fig. 2 is a plan of key-levers and related parts with spacing mechanism superposed in correct relative position.

A rocking frame D, Fig. 4, is pivoted in the bail C by means of a central rod $d$, of which the middle part lies within a notch $c^5$ in middle piece $c$ and the ends enter holes in side pieces $c'\ c'$, Fig. 2, the last being sprung slightly apart to admit of the frame being mounted in the bail. The rocking frame consists, preferably, of a single piece of suitably-shaped sheet metal bent into form and strengthened by being brazed or otherwise rigidly fixed upon the central rod $d$. From the rocking frame D and formed integral therewith rises a driving-arm E, Figs. 1 and 10, having at its upper end a wing $e$, carried by a loose stud $e'$, which is secured in place by a nut, as shown. The wing $e$ enters an annular groove $k^2$, formed in a collar $k$, fixed at the base of the type-sleeve K, Figs. 3 and 4. Under impulse of springs $c^3$ $c^3$, coiled on fulcrum-rod $a^2$, Fig. 2, universal bail C rises toward the lower edges of the key-levers until antifriction-rollers $d^2$ $d^2$, Figs. 5 and 7, pivoted in the casting A on pins $d^3$ $d^3$, rest within notches $d^5$ $d^5$, which are formed, as shown in Fig. 7, in ends $d'$ $d'$ of rocking frame D. When rollers $d^2$ $d^2$ and notches $d^5$ $d^5$ are interlocked, the rocking frame D, a stop-bail F, Fig. 5, pivotally mounted thereon, and driving-arm E, which is integral with frame D, are held in a middle position. The rocking frame is given such form, which is preferably that shown in Fig. 2, that some of the type-levers when depressed engage it backward of its axis of oscillation $d$ in the universal bail C and the rest of them make contact with it on the forward side of its axis. The two sets of levers are respectively marked B and B' in the drawings. A lever of series B when brought down strikes upon the backward edge of the rocking frame, causing driving-arm E to recede from the operator; but a lever belonging to set B', acting on the other edge of the frame, gives an advancing movement to the arm. Owing to the engagement of wing $e$, Figs. 5 and 10, with groove $k^2$, Fig. 3, the type-sleeve recedes and advances upon impression-arm I in unison with movements of driving-arm E, Figs. 3 and 4.

On the upper edges of type-levers B B', Fig. 7, are formed projections $b'$ $b'$, which are intended to act as stops limiting the movement of stop-bail F. Depression of any type-controlling key-lever carries the projection belonging thereto downward into the path of stop-bail F, which is thus arrested, stopping in turn the rocking movement of frame D, on which it is mounted, and sleeve-propelling movement of driving-arm E.

Figures 9, 10, 11, 12:
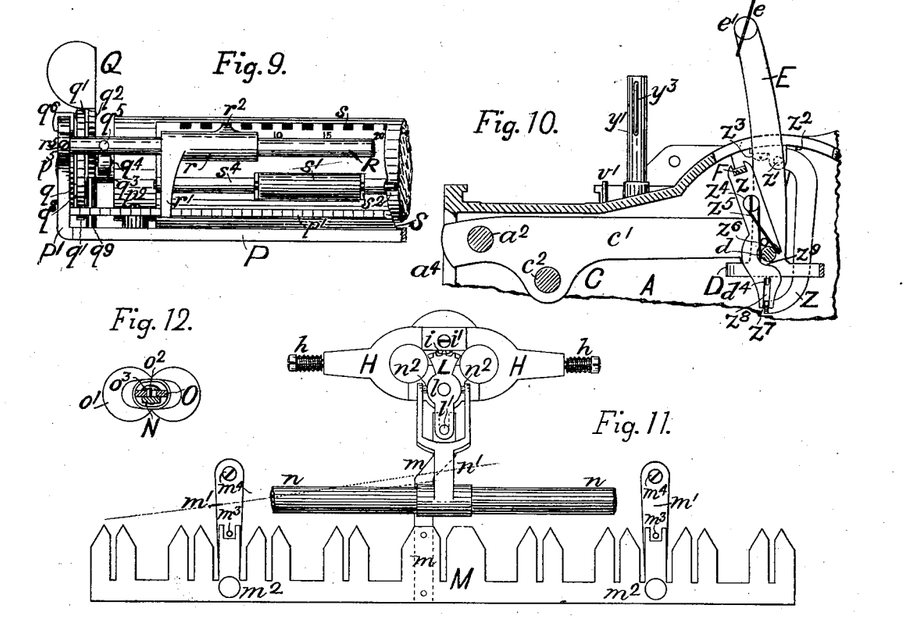
Fig. 9 is a front elevation of a portion of paper carriage and platen.
Fig. 10 shows details principally relating to mechanism for insuring certainty in the selection of type characters.
Fig. 11 shows details of type-column-selecting mechanism.
Fig. 12 shows under side of field-shifting finger-button.

From a depending arm $l^2$, Fig. 4, of the helical toothed segment L a pin $l'$ passes backward through a notch at the upper end of a projection $m$, rigidly fastened to a comb M, Figs. 4 and 5. Figs. 2, 4, 5, and 11 set forth the preferred form of this comb, which extends teeth upward below the key-levers from side to side and is supported by sidewise deflectable hangers $m'$ $m'$, pivoted on screws $m^4$ $m^4$ in the main frame A, its endwise movement being limited by pins $m^3$ $m^3$ in the hangers $m'$ $m'$, which enter notches in the comb, as shown in Fig. 11. A type-lever B or B' while descending traverses the edge of a tooth belonging to hanging comb M and in so doing swings the comb endwise into a position corresponding with one of several columns of characters making up a type-field on sleeve K. Three such columns will be found a convenient number. Such endwise movement of the comb M is transmitted through the notched projection $m$, pin $l'$, and depending arm $l^2$ to segment L, which last, acting on pinion $i$, turns rod $i^2$, and thus by means of tongue $i^3$ rotates sleeve K to bring the column of characters containing the selected type into line with the printing-point. The type-sleeve K may be provided with several fields of type—for instance, three—any one of which can be brought into operating position by means of shift-keys—such, for example, as will be hereinafter described. Each field should consist of the same number of columns of type, so that any one field can be brought under the column-selecting action of the comb M. During its downward stroke an actuated type-lever B or B' depresses the rocking frame, and as notches $d^5$ $d^5$ are disengaged from rollers $d^2$ $d^2$, Fig. 7, the frame D rocks in the universal bail C under the upward tension given to the latter by springs $c^3$ $c^3$, Fig. 2, causing the driving-arm E, which is integral with the frame D, to advance or recede until such movement is arrested by contact between stop-bail F (which has a limited pivotal movement on said frame) and the intercepting projection $b'$, belonging to the lever. In its movement the driving-arm E by means of the wing $e$, Fig. 10, engaged with the annular groove $k^2$, Figs. 3 and 4, forces type-sleeve K along impression-arm I until the row of type containing the selected character is brought opposite the printing-line. In its descent rocking frame D depresses the universal bail C and by means of impression-link G, Fig. 4, pivoted at its lower end on a pin $g^2$ and at its upper end on a screw $g'$, which last serves to clamp a clasp or split collar $g$ upon arm J, Fig. 5, vibrates trunnioned base H, causing the impression-arm I to bring type-sleeve K down toward the printing position. As this movement proceeds the key-lever by acting on hanging comb M causes that column of type which contains the selected character to be rotated into the lowermost position. After being brought opposite the printing-point by combining the row-selecting action of stop-bail F and intercepting-stop with the column-selecting action of comb M and key-lever in the manner described the type character is impressed by a further downward movement of the key-lever, which depresses rocking frame D and universal bail C without altering their positions relative to each other. The contact edges of the rocking frame are preferably notched away, somewhat as shown in Fig. 5, so that some of the type-levers may have a certain amount of free play before striking thereupon. The two edges of the frame are also given an unequal radial sweep with respect to their axis of motion in the universal bail. By these means an approximately equal finger depression is obtained throughout the keyboard.

On collar $k$ are formed as many ratchet-teeth $k^4$, Fig. 5, as there are columns of type characters on sleeve K and also a flange $k^3$. Upon the tubular arm J is pivoted by lugs $j^6 j^7$ an oscillating rack $j$, having as many notches, preferably of the form shown in Figs. 1, 3, 4, and 5, as there are rows of type characters. Endwise displacement of rack $j$ is prevented by placing its lug $j^6$ between trunnion H and the clasp or split collar $g$, which is clamped upon arm J. A pin $j'$ is fixed in lug $j^7$ of said rack, as shown in Figs. 3, 4, and 5. A spring $j^4$, coiled on arm J, turns the rack outward until it is brought to rest against pin $j^5$, Fig. 3, fixed in trunnion H. An antifriction-roller $j^2$ is pivoted at $j^3$ in an arm $g^3$, forming part of impression-link G. When impression-arm I swings downward to the printing position, relative movement of the parts is such that roller $j^2$ is brought into contact with pin $j'$ and rack $j$ is thrown over until one of its notches engages flange $k^3$, while its inner angle beyond the notch passes between two of the ratchet-teeth $k^4$, as shown in Fig. 5, such interlocking of rack and ratchet securing accurate adjustment of type-sleeve K with reference to the printing-point at the moment of impression. While throwing the rack, roller $j^2$ traverses on pin $j'$ and finally, nearing its tip, runs upon a sloped part, where it ceases to affect the rack appreciably. The length of pin $j'$ is such that cessation of throw occurs just as rack and ratchet-collar become fully interlocked and as a selected type character nears the printing-point.

The ends $f$ of the stop-bail F, Fig. 7, are notched at $f^2$, so as to receive loosely the axial rod $d$, and somewhat above this rod said ends are pivoted at $f'$ on pins fixed in the ends $d'$ of rocking frame D, such connection permitting a limited back-and-forward movement of bail F relative to frame D. A lever $z$, Fig. 10, notched at its upper end to engage bail F, is pivoted by a screw $z^4$ to driving-arm E and extends below the axial rod $d$, partially inclosing this rod loosely at $z^9$ and having a slot $z^8$ intended to receive a point $z^7$, belonging to a hooked detent Z, which hangs from a pin $z'$ in a lug $z^2$, fastened to frame-casting A by a screw $z^3$. A spring $z^5$ is coiled on screw $z^4$ and, as shown in Fig. 10, its arms press in opposite directions against axial rod $d$ and a pin $z^6$, fixed in lever $z$, tending to keep these two coincident. Normally the slotted lever $z$ and bail F are retained in a middle position by the spring $z^5$, and detent-point $z^7$ is held opposite a projection $d^4$ on the rocking frame D, so that frame D and universal bail C cannot be sufficiently depressed to allow of an impression being made until the stop-bail strikes that intercepting projection which pertains to the actuated key-lever. When such contact occurs, the bail is vibrated slightly relative to the rocking frame, and slotted lever $z$ throws detent-point $z^7$ out of line with the opposing projection $d^4$, so that the printing movement may be fully completed. The movement of stop-bail F and rocking frame D relative to each other is governed and limited by the play of notches $f^2 f^2$, Fig. 7, and $z^9$, Fig. 9, on rod $d$.

The mechanism just described is designed to prevent the accidental impression of any character other than that corresponding with an actuated type key-lever. By springing the driving-arm E slightly aside after preferably pushing it backward as far as it will go the type-sleeve may be released from wing $e$ and withdrawn from the impression-arm.

Figure 15:
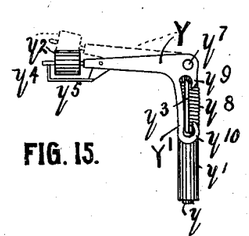
Figs. 15 and 16 are side and rear views illustrating the action of the inking mechanism.
Figure 16:
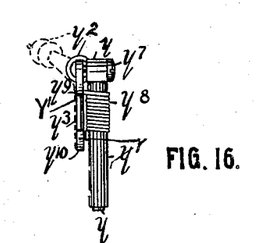

Type characters are inked on their way to the printing-point after selection by a roller $y^2$, mounted on a pin $y^4$ at the end of a nearly horizontal inking-arm, which forms part of an elbow-lever Y, as shown in Figs. 3, 4, 6, 15, and 16. This lever is pivoted by a screw $y^7$, fixed therein to a vertical pintle $y$, Figs. 6, 15, and 16, which turns in a hollow post $y'$, rising from the main frame A. The pintle $y$ is supported by a head formed at its upper end and resting on the top of the hollow post $y'$. A hole through the pintle-head forms a long bearing for the body of screw $y^7$. By thus connecting these parts elbow-lever Y is rendered capable of two movements one in a vertical plane on its pivot $y^7$ and one horizontally around the axis of the pintle $y$ whenever this last rotates. A staple $y^3$ is rigidly fixed in the post $y'$, and a torsion-spring $y^8$ is coiled on said post. The spring $y^8$ acts on elbow-lever Y at $y^9$. Its pull at this point which would tend to depress the lever Y if the pivot $y^7$ were immovable actually elevates the said lever owing to the pivot $y^7$ traveling in a horizontal plane on its pintle $y$ under the pull of the spring $y^8$ and taking the lever Y bodily with it, so that the depending arm Y' is held against and tripped upwardly by the immovable staple $y^3$, thus turning the lever Y upward, in which normal position the inking-arm Y lies obliquely upward toward the left-hand side, as shown in full lines in Figs. 1 and 4 and in dotted lines in Figs. 15 and 16, and the inking-roller $y^2$ thus rests in the path of a selected type character. In action when the type-sleeve in descending toward the printing position strikes upon inking-roller $y^2$ the inking-arm Y is depressed, but is not carried directly downward, owing to the abutment of its member Y' against the immovable staple $y^3$. The point of contact against the staple $y^3$ constitutes a fulcrum on which elbow-lever Y turns, thus exerting a pull on the pivot $y^7$ against the resistance of spring $y^8$ under the pressure of the type-sleeve upon the inking-roller $y^2$. Owing to the aforesaid manner in which the elbow-lever Y is pivoted to the revoluble pintle $y$, the latter is necessarily rotated by this pull on the pivot $y^7$, and the inking-arm Y is constrained to swing toward the right-hand side as the pintle rotates. The resultant motion of the combined movements of depression and lateral swing imparts an oblique downward movement of the inking-arm Y, which now takes a position indicated by the full lines in Figs. 15 and 16, and thus carries inking-roller $y^2$ across the face of a selected character and subsequently completely clear of same to one side of the type-sleeve. When the key is released and the type-sleeve returns, the arm Y is returned by the spring $y^8$ to normal position, as shown in dotted lines. The rear edge of the member Y', which reacts upon staple $y^3$, is curved slightly outward throughout its length, as shown in Figs. 4 and 15, so that the point of contact or fulcrum may roll down away from pivot $y^7$ as the inking-arm Y is pressed down, thus increasing, in effect, the length of dependent member Y', and consequently accelerating the swing of inking-roller $y^2$ aside from the type-path. The hook $y^{10}$, Figs. 4, 15, and 16, serves as a back-stop, its point catching against staple $y^3$ when spring $y^8$ returns the parts to their normal positions. Inking-roller $y^2$ is retained on pin $y^4$ and kept out of contact with the writing-paper by a latch $y^5$, secured to the inking-arm by a rivet $y^6$, on which it may turn stiffly. By raising the forward end of latch $y^5$ its backward part may be depressed sufficiently to allow of roller $y^2$ being withdrawn from pin $y^4$.

In order to shift from one type-field to another of, for example, three type-fields, the toothed segment L, with its supporting-rod $l$, is moved endwise by a forked arm $n'$, Figs. 2 and 4, which rises from a shift-rod $n$, extending transversely above the key-levers between pivot-screws $n^4$, fixed in frame-casting A. Pins $n^2$, Fig. 11, in forked arm $n'$ enter a slot in depending arm $l^2$, Fig. 4, of segment L and form a connection between these parts. From each end of the shift-rod $n$ a shift-lever N, Fig. 2, projects forward at the side of the keyboard and carries on a screw or rivet $o^2$ a hanging latch O, which bears a double finger-piece $o'$ at its upper end. (See Figs. 1, 3, and 12.) Either latch may be pushed down by means of its finger-piece $o'$ until the upper side of a notch $o^5$, Fig. 4, in its forward edge or another, $o^6$, in its backward edge strikes upon a stop-pin $o$, fixed in the adjacent side of main frame A, Figs. 1, 2, and 4. Each latch is retained in its usual position, which is that shown in the drawings, by gravity. This position with respect to the shift-lever N is not altered by pressure on a double finger-key $o'$ beyond its latch-pivot $o^2$, and consequently as the lever N descends the backward notch $o^6$ is brought down until its upper side is intercepted by pin $o$. Finger-pressure applied forward of screw $o^2$ rocks the key $o'$ thereon and swings latch O far enough edgewise across stop-pin $o$ to allow of this being reached by the forward notch $o^5$. The notches are so placed that in bringing one of them opposite stop-pin $o$ sufficient movement is transmitted to toothed segment L through lever N, rod $n$, and arm $n'$ (the last three being rigidly connected) to change the ordinary type-field to one of capital letters; but a field consisting of figures, &c., is brought under control of the keyboard, while the other notch faces a stop-pin. The axial movement of the segment L produces, by means of the helical teeth, a corresponding partial rotation of the pinion $i$, and therewith of the type-sleeve K, to bring about the said change of type-field. When two shift-keys $o'$, rigidly connected, and consequently moving in unison, are provided, as shown in the accompanying drawings, in order to avoid any occasional mutual interference it is desirable that each latch O gravitate normally into such position that the notch $o^6$ therein, which requires the greater depression of lever N to place it opposite the corresponding stop-pin $o$, should be capable of reaching that pin without further adjustment. A pin $o^3$, fixed in shift-lever N, enters a perforation in latch O and allows it only sufficient edgewise movement to fully cross stop-pin $o$, the free end $o^4$, Figs. 2 and 4, of this latter pin $o$ being flattened that necessary swing of the latch may be as small as possible. When either shift-lever has been depressed far enough to change the type-field, it may be fastened down by passing the retaining-finger across and beyond the middle line of its finger-piece $o'$. This movement will rock the finger-piece $o'$ and swing the latch O on its pivot until stop-pin $o$ is clutched by the contiguous notch. Backward extensions of shift-levers N N pass through the outermost of the kerfs $a^4$ and are bent aside at N' N', Fig. 2, to form back-stops, when the parts return under impulse of springs $n^3$ $n^3$ to their normal position.

A platen $p$, Fig. 1, is pivoted in end brackets P' P', belonging to the carriage P, which reciprocates in ways or guides in a usual manner.

A paper-guide S, Fig. 9, made of sheet metal and having a longitudinal fold $s^4$ formed therein, is fastened at $s^3$, Fig. 4, along its lower edge to the carriage-slide. Tension-rollers $s'$ $s'$ $s'$ are fixed on a rod $s^2$, which forms a common pivot for them and lies in the fold $s^4$, portions of the fold and of adjacent parts of the guide being cut away where necessary, as shown in Fig. 9. Guide S is so adjusted and fixed to the carriage-slide that it presses rollers $s'$ $s'$ $s'$ with about equal force upon writing-paper passing between them and the platen $p$.

On the uppermost edge of paper-guide S is engraved or otherwise formed a scale $s$, consisting of broad marks and spaces, as shown in Figs. 1 and 9. Increased legibility is secured by the use of such scale divisions, as characters when impressed along the printing-line appear alternately opposite broad marks and spaces, both as wide as the characters themselves, instead of successively before narrow lines, such as are ordinarily employed to indicate scale divisions.

A grooved rod R, Fig. 1, is supported by the carriage ends P' P' and bears sliding tubes $r\ r$, having dependent stop-fingers $r'\ r'$, Fig. 9. These stop-fingers fall into engagement with an escapement-rack $p'$, fastened by screws $p^2\ p^2$ to carriage P, the stop-finger tips being formed to fit the spaces between adjacent rack-teeth. Internally each sliding tube $r$ is large enough for the greater portion of its length to receive a spring of the form shown in Fig. 14, which spring incloses the rod R and is kept in place by a collar $r^4$, Fig. 13, driven into the tube. End $r^7$ of the spring projects outward through a slot in tube $r$, and the other end $r^6$ is turned back lengthwise within the body of the spring, as shown, so as to lie and be capable of moving smoothly in groove R' when tube $r$ is pushed along rod R. The carriage P is impelled toward the left hand by a spring-drum T, acting through a cord $t$, Figs. 1 and 3.

On screws $u$, Figs. 1 and 2, fixed in lugs forming part of the main frame A, is pivoted a spacing-finger U, having a lateral projection $u'$, which intercepts the advancing right-hand stop-finger $r'$ when a line of writing is complete, bringing the carriage to rest. Similarly when the the carriage is returned in order to begin a line of writing the left-hand stop-finger is brought against the spacing-finger edge at $u^2$, Fig. 2, where an oblique facet parallel with the backs of the rack-teeth is formed. By giving stop-facet $u^2$ the angle shown impact between it and the arrested stop-finger cannot cause displacement of the latter from the tooth-space in which it rests. Consequently a rack having teeth of the ordinary shape, with square faces and inclined backs, can be used. The sliding tubes $r\ r$, Fig. 9, may be adjusted upon rod R in such manner that their fingers $r'\ r'$ will arrest carriage movement, so as to secure a printing-line of any desired length anywhere within the limits shown by scale $s$. Points $r^2\ r^2$, Fig. 1, projecting from the movable tubes, indicate upon scale $s$ the position of initial and final characters. Consequently the length of a line of writing and the width of margin left at both edges of the paper are also apparent.

Fixed to grooved rod R is a bail-like clip $q^5$, Fig. 1, which is intended to keep the paper down upon the platen along the printing-line. Tension is put upon paper-clip $q^5$ by the springs $r^3\ r^3$, Figs. 13 and 14, which also hold stop-fingers $r'\ r'$ in engagement with the escapement-rack $p'$, Fig. 9. Endwise movement of rod R is prevented by a screw $r^5$, the tip of which enters an annular groove near the end of the rod.

On a post $t^2$, Figs. 1 and 2, fixed obliquely in the main frame A, is pivoted a bell-lever $t'$, which is preferably made of wire, its middle part being formed into a coil to fit the fulcrum-post $t^2$, as shown. One end of the wire lever is weighted and carried within a bell T' to act as clapper thereto. Its other end is bent, as shown in the drawings, an angle or heel being formed at $t^3$ in such position that the right-hand stop-finger $r'$ may strike thereagainst as a line of writing nears completion. After thus sounding the bell the lever rebounds until its free end beyond heel $t^3$ rests against the face of stop-finger $r'$, where it remains until the carriage is returned to begin a fresh line, when owing to the obliquity of its fulcrum-post $t^2$ the clapper falls fully back into its usual position.

A spacing-link W, Fig. 4, is pivoted to the middle part of a lever $w$, which is placed intermediately between the space-making lever X and the middle piece $c$ of the universal bail C, one end of the intermediate lever $w$ being connected by a link $w'$, pivoted on a screw $x$, with the spacing-lever X, so as to be depressible thereby, while its other end is attached by a pin $w^3$ to the middle piece $c$ of the universal bail C and descends therewith when any type-controlling lever B B' is pushed down. When owing to movement of either universal bail or spacing-lever only one end of the intermediate lever $w$ is depressed, turning upon the pivot at its other end, it draws the spacing-link W downward through a distance less in proportion as its point of attachment on the lever nears the fulcrate end thereof. Coincident descent of a type-lever B or B' and spacing-lever X depresses the intermediate lever $w$ bodily and draws spacing-link W downward through a distance equaling in amount the sum of those movements resulting from two separate strokes made by the same levers. At its upper end the spacing-link W is connected by a screw $w^2$ with spacing-finger U, Figs. 2 and 4, to the under side of which on a screw $v$ is pivoted a spacing-pawl V. A stepped stop $w^4\ w^5$ projects backward from the upper end of spacing-link W, opposite a lateral extension $v^4$ of the spacing-pawl. A spring $v^2$, secured at $v^3$ to the spacing-finger, presses against a flat formed at the base of pawl V and impels it toward a position in which its tip is somewhat more than the width of two teeth of rack $p'$ to the right of the spacing-finger tip $u^5$. Usually the spacing-finger U is supported by spacing-link W in a position which brings the spacing-pawl tip between two rack-teeth, and the carriage-spring overcoming the resistance of spring $v^2$ then turns the pawl leftward until its tip coincides with that of the finger, being stopped in this position by the projecting point of a screw $u^4$ in the spacing-finger. As key-levers are depressed spacing-finger U is swung downward by spacing-link W, and the stepped stop $w^4$ and $w^5$ comes into such position that it can intercept the pawl extension $v^4$ when the pawl-tip escaping from the rack $p'$ has placed itself under impulse of spring $v^2$ opposite another rack-space. This space will be that next succeeding if a single lever is actuated, but the second following one if a type-lever and spacing-lever X are pressed at the same time, the pawl movement depending on the depth to which spacing-link W carries its stepped projection $w^4 w^5$. Any lever B or B', acting through the universal bail C, or the spacing-lever X, acting through the short link $w'$, can depress but one end of the intermediate lever $w$ and communicates, therefore, only sufficient movement to link W to place step $w^4$ in the path of pawl extension $v^4$; but when a lever B or B' and the lever X act together the intermediate lever $w$ being depressed bodily brings the spacing-link W down far enough to carry step $w^4$ past pawl extension $v^4$, which is then intercepted by step $w^5$ when the spacing-pawl tip has moved over a double space. Thus the space following a word may be made at the same time that its last letter is impressed. Upon return of the various parts to their usual positions pawl V is replaced leftward by rack $p'$ as the carriage makes a spacing movement. The stepped projection $w^4 w^5$ is cut away at $w^6$, Fig. 1, in order that it may return from its lowermost position without catching beneath the pawl extension $v^4$. When the carriage is pushed backward toward the right-hand side of the machine, the rack-teeth tilt spacing-pawl V until they can pass its tip. If the space-lever X is pressed at this time, the pawl-tip will be brought down upon a fixed pin $v'$, Fig. 4, in the frame-casting and held in its tilted position, leaving the carriage free for movement in either direction until the space-key is released. Space-key lever X is preferably formed of a single piece of sheet metal. Its downward movement is limited by a stop $x'$.

The printing-point is located by an indicator $u^3$, Figs. 2 and 4, made of thin flexible metal and secured to the spacing-finger by a screw $u^4$. As the type-sleeve descends to make an impression, indicator $u^3$ is withdrawn from its path and below the printing-line by the spacing-finger.

A line-space lever Q is pivoted on a gudgeon $p^6$, Fig. 8, fixed in the platen end, lateral stiffness being secured by a tubular boss Q', which is a part of the lever. On the gudgeon $p^6$ is formed an annular rabbet to receive a ratchet-wheel $p^4$, which is clamped securely, so as to turn with the platen, by a screw $p^5$. The head of this screw forms the platen-pivot turning in the end bracket of carriage P. A hooked pawl $q'$, Fig. 4, is mounted on a screw $q^2$, Fig. 8, fixed in line-space lever Q. This lever also carries on a pin $q^4$, Fig. 9, an antifriction-roller $q^3$, which is placed below an end of the paper-clip $q^5$, Figs. 1 and 9, in order that this clip may be raised off the writing-paper when platen $p$ is rotated to make a line-space. A pin $q^9$, Fig. 9, fixed in carriage-slide P, forms a back-stop for lever Q when it is returned to its normal resting position by the pressure of paper-clip $q^5$ on roller $q^3$. The line-spacing movement is regulated by a thin lever $q$, of sheet metal, mounted loosely on platen-pivot $p^5$, Fig. 3, and having a ledge $q^8$, Fig. 4, at its lower end, which may be brought by a finger-piece $q^6$ at its upper end into the path of a shoulder $q^{10}$ on space-lever $q$. The line-space regulator is secured by dropping its finger-piece $q^6$ into a notch formed in the adjacent carriage end, there being as many such notches $q^7$, Figs. 1 and 3, as there are widths of line-space provided for in the machine.

A slot $a^3$, Fig. 1, allows the driving-arm to rise through the main frame-casting, in which other suitable openings are also made for the passage of impression-link G, spacing-link W, and notched projection $m$.

I declare that what I claim is—

1. In a type-writing machine, the combination with a type-sleeve mounted on an arm adapted to be oscillated by finger-key mechanism to make an impression of a type character, and means for shifting said sleeve axially on the arm to bring a selected row of type into printing position; of a rod revolubly mounted within said arm, means for locking said rod at its backward end to the type-sleeve as regards relative rotation, while permitting independent axial movement of the sleeve, and means for more or less rotating said rod and therewith the sleeve under the action of the finger-key mechanism to bring a selected column of type into lowermost position, substantially as described.

2. In a type-writing machine, the combination with a type-sleeve mounted on an arm adapted to be oscillated by finger-key mechanism to make an impression of a type character, and means for shifting said sleeve axially on the arm to bring a selected row of type into printing position; of a rod revolubly mounted within said arm, a tongue fixed on the backward end of said rod, a longitudinal groove in the inner face of the sleeve to receive said tongue, and means for more or less rotating said rod and therewith the sleeve under the action of the finger-key mechanism to bring a selected column of type into lowermost position, substantially as described.

3. In a type-writing machine, the combination with a type-sleeve mounted on an arm adapted to be oscillated by finger-key mechanism to make an impression of a type character, and means for more or less rotating said sleeve under the action of the finger-key mechanism to bring a selected column of type into lowermost position; of an annular groove at the base of the type-sleeve, a driving-arm pivotally supported at one end, and having its other end adapted to engage said annular groove, and means for oscillating the driving-arm under the action of the finger-key mechanism to shift the type-sleeve axially on its supporting-arm and bring a selected row of type into printing position, substantially as described.

4. In a type-writing machine, the combination with a type-sleeve mounted on an arm adapted to be oscillated by finger-key mechanism to make an impression of a type character, and means for more or less rotating said sleeve under the action of the finger-key mechanism to bring a selected column of type into lowermost position; of an annular groove at the base of the type-sleeve, a driving-arm pivotally supported at one end, and having on its other end a wing adapted to engage in said annular groove, said wing being carried by a loose stud adapted to be clamped to the driving-arm, and means for oscillating the driving-arm under the action of the finger-key mechanism to shift the type-sleeve axially on its supporting-arm and bring a selected row of type into printing position, substantially as described.

5. In a type-writing machine, the combination of a pivotally-mounted arm, a type-sleeve revoluble and axially adjustable on said arm, means for oscillating said arm and sleeve by finger-key mechanism to make an impression of a type character, a rod revolubly mounted within said arm, means for locking said rod at its backward end to the type-sleeve as regards relative rotation while permitting independent axial movement of the sleeve, means for rotating said rod and sleeve to a variable extent under the action of the finger-key, mechanism to bring a selected column of type into lowermost position, an annular groove at the base of the type-sleeve, a driving-arm pivotally supported at one end and having its other end adapted to engage said annular groove, and means for oscillating the driving-arm under the action of the finger-key mechanism to shift the type-sleeve axially on its supporting-arm, and bring a selected row of type into printing position, substantially as described.

6. In a type-writing machine, the combination of pivotally-mounted tubular arm I, a type-sleeve revoluble and axially adjustable on said arm and having interior longitudinal groove $k'$, means for oscillating said arm and sleeve by finger-key mechanism to make an impression of a type character, rod $i^2$ within said arm, tongue $i^3$ on the backward end of said rod to engage the longitudinal groove $k'$, means for more or less rotating rod $i^2$ and therewith the type-sleeve under the action of the finger-key mechanism to bring a selected column of type into lowermost position, a pivotally-supported driving-arm E carrying wing $e$ engaging a groove $k^2$ at the base of the type-sleeve, and means for oscillating the driving-arm under the action of the finger-key mechanism to shift the type-sleeve axially on arm I and bring a selected row of type into printing position, substantially as described.

7. In a type-writing machine the combination with an adjustably-mounted type-carrier and a plurality of finger-key levers; of a rocking frame adapted to be engaged by said levers some backward of its axis and others forward of its axis to rock the frame, means for bodily depressing said rocking frame, and means for transmitting movement from said frame to the type-carrier to adjust the latter axially according to the type character required to be brought into printing position, substantially as described.

8. In a type-writing machine, the combination with an adjustably-mounted type-carrier, and a plurality of finger-key levers; of a rocking frame adapted to be engaged by said levers and rocked thereby, a stop-bail mounted on said frame, means for bodily depressing said frame and stop-bail, and projections on the finger-key levers adapted to be carried into the path of the stop-bail to limit the movement of the rocking frame to a variable extent according to the lever depressed, and means for transmitting movement from said frame to the type-carrier to adjust the latter axially to bring the required type character into printing position, substantially as described.

9. In a type-writing machine, the combination with an adjustably-mounted type-carrier and a plurality of finger-key levers; of a depressible universal bail, a rocking frame mounted therein, adapted to be engaged by the finger-key levers and rocked thereby, means for limiting the rocking movement to a variable extent according to the lever depressed, means for transmitting movement from said frame to the type-carrier to adjust the latter axially to bring the required type character into printing position, and antifriction-rollers mounted in the machine-frame adapted to be engaged by notches formed in the ends of the rocking frame to return the latter and the type-carrier to a middle position when the depressible bail returns to its normal position substantially as described.

10. In a type-writing machine, the combination of a type-carrier mounted on a support adapted to be oscillated to make an impression of a type character, a universal bail adapted to be depressed by finger-key levers, means for transmitting movement of the bail to the type-carrier support, means for more or less rotating said type-carrier under the action of the finger-key levers to bring a selected column of type into lowermost position, a rocking frame mounted in said bail, a rigid driving-arm on said rocking frame having its upper end adapted to engage the type-carrier, and means for oscillating said frame and driving-arm under the action of the finger-key levers to shift the type-carrier axially on its support and bring a selected row of type into printing position, substantially as described.

11. In a type-writing machine, the combination of a type-carrier mounted on a support adapted to be oscillated to make an impression of a type character, a universal bail adapted to be depressed by finger-key levers, means for transmitting movement of the bail to the type-carrier support, means for more or less rotating said type-carrier under the action of the finger-key levers to bring a selected column of type into lowermost position, a rocking frame mounted in said bail and adapted to be engaged by the finger-key levers some backward of its axis and others forward of its axis to rock the frame, a rigid driving-arm on said rocking frame having its upper end adapted to engage the type-carrier and shift the latter axially on its support as the frame is rocked to bring a selected row of type into printing position, a stop-bail mounted on the rocking frame, and projections on the finger-key levers adapted to be carried into the path of the stop-bail and engage the latter to limit the movement of the rocking frame and stop the propelling movement of the driving-arm at the required position of the selected type according to the lever depressed, substantially as described.

12. In a type-writing machine, the combination with an adjustably-mounted type-carrier, and a plurality of finger-key levers; of a depressible universal bail, a rocking frame mounted therein adapted to be engaged by the finger-key levers and rocked thereby, a stop-bail pivotally mounted in said frame, means for limiting the pivotal play of the stop-bail, means adapted to intercept the stop-bail and limit the movement of the rocking frame to a variable extent according to the finger-key lever depressed, means for transmitting movement from said frame to the type-carrier to adjust the latter axially to bring the required type character into printing position, means for returning the rocking frame and type-carrier to a middle position when the depressible bail returns to its normal position, and means for intercepting the rocking frame to prevent a printing movement of the parts until the stop-bail has made its limited pivotal movement under the action of the actuated key-lever, substantially as described.

13. In a type-writing machine, the combination with an adjustably-mounted type-carrier and a plurality of finger-key levers: of a depressible universal bail, a rocking frame mounted therein adapted to be engaged by the finger-key levers and rocked thereby, a stop-bail pivotally mounted in said frame and having its ends notched to loosely receive the axial rod of the frame and allow a limited pivotal movement of the stop-bail, stops on the finger-key levers adapted to intercept the stop-bail and limit the movement of the rocking frame to a variable extent according to the finger-key lever depressed, means for transmitting movement from said frame to the type-carrier to adjust the latter axially to bring the required type character into printing position, means for returning the rocking frame and type-carrier to a middle position when the depressible bail returns to its normal position, lever $z$ pivoted on an arm rigid with the rocking frame, said lever at its upper end engaging the stop-bail, and having its lower end extended to partially inclose the axial rod of the rocking frame, slot $z^8$ in said extended end, a hooked detent pivotally suspended on the machine-frame, point $z^7$ on said detent to engage in slot $z^8$, a spring device adapted to retain lever $z$, stop-bail, and hooked detent normally in a middle position, and projection $d^4$ on the rocking frame adapted to lie opposite the detent-point $z^7$ in said middle position of the parts and prevent an impression movement until the stop-bail is engaged by the intercepting-stop on the actuated key-lever and is slightly oscillated to move the detent-point out of line with projection $d^4$ when the printing movement may be completed, substantially as described.

14. In a type-writing machine the combination with an adjustably-mounted type-carrier, and a plurality of finger-key levers: of universal bail C, rocking frame D adapted to be engaged and rocked by the key-levers and having driving-arm E adapted to engage and adjust the type-carrier axially according to the movement of said frame, a stop-bail F having limited pivotal play, projections $b'$ on the key-levers to intercept the stop-bail, antifriction-rollers $d^2$ adapted to be engaged by notches formed in the ends of frame D, a lever $z$, hooked detent Z having point $z^7$ engaging slot $z^8$ in said lever, spring $z^5$ and pin $z^6$ on said lever, and a projection $d^4$ on the rocking frame, substantially as and for the purpose set forth.

15. In a type-writing machine, the combination with a support adapted to be oscillated by finger-key mechanism, a type-carrier revolubly mounted thereon, and a plurality of finger-key levers: of a movably-mounted comb having teeth adapted to be engaged by the key-levers to deflect the comb endwise into different positions according to the key-lever depressed, a segment revolubly mounted in the oscillatory support with its axis parallel to the axis of the type-carrier, means for transmitting movement from the comb to the segment to oscillate the latter, and means for transmitting movement from the segment to the type-carrier to more or less rotate the latter according to the type character controlled by the actuated key-lever, substantially as described.

16. In a type-writing machine, the combination with a support adapted to be oscillated by finger-key mechanism, a type-carrier revolubly mounted thereon, and a plurality of finger-key levers: of a segment revolubly mounted in said support, said segment having helical teeth, a pinion having helical teeth mounted in the support to gear with said segment, means for oscillating the segment under the action of the finger-key levers into different positions according to the key-lever depressed, and means for transmitting the resulting rotary movement of the pinion to the type-carrier to more or less rotate the latter according to the type character controlled by the actuated key-lever, substantially as described.

17. In a type-writing machine, the combination with a support adapted to be oscillated by finger-key mechanism, a type-carrier revolubly mounted thereon, and a plurality of finger-key levers; of an adjustably-mounted comb having teeth adapted to be engaged by the key-levers to deflect the comb endwise into different positions according to the key-lever depressed, a segment revolubly mounted in the oscillatory support, said segment having helical teeth; means for transmitting movement from the comb to the segment to oscillate the latter, a pinion having helical teeth mounted in the support to gear with said segment, and means for transmitting movement of the pinion to the type-carrier to more or less rotate the latter according to the type character controlled by the actuated key-lever, substantially as described.

18. In a type-writing machine, the combination with a support adapted to be oscillated by finger-key mechanism a type-carrier revolubly mounted thereon, said type-carrier having several fields of type characters thereon, and a plurality of finger-key levers; of a segment revolubly mounted in said support and axially adjustable therein, said segment having helical teeth, a pinion having helical teeth mounted in the support to gear with said segment, means for oscillating the segment under the action of the finger-key levers into different positions according to the key-lever depressed, means for transmitting the resulting movement of the pinion to the type-carrier to more or less rotate the latter according to the type character controlled by the actuated key-lever and means for axially adjusting the segment in its support to a variable extent under the action of shift-key levers to impart other rotary movements to the pinion and type-carrier adapted to bring another field of type characters thereon into operative position, substantially as described.

19. In a type-writing machine, the combination of trunnioned base H, impression-arm I thereon, type-sleeve K, rod $i^2$, pinion $i$, a segment L gearing with said pinion and attached to a rod $l$ mounted within a tubular arm J on base H, and means for imparting rotary and axial movements to the segment and rod $l$ within the arm J to a variable extent under the action of finger-key mechanism and shift-keys, substantially as and for the purpose set forth.

20. In a type-writing machine, the combination of trunnioned base H, impression-arm I thereon, type-sleeve K, rod $i^2$, pinion $i$, a segment L gearing with said pinion and attached to a rod $l$ mounted within a tubular arm J on base H, a comb M supported by sidewise-deflected hangers, a projection $m$ on said comb, depending arm $l^2$ on the segment, a pin $l'$ on arm $l^2$ and passing through a notch in projection $m$, a plurality of finger-key levers adapted to engage the teeth of comb $m$ to deflect the latter and oscillate the segment, a pivotally-mounted forked arm $n'$ having pins $n^2$ engaging a slot in arm $l^2$ of the segment, and shift-key mechanism adapted to swing the arm $n'$ to axially adjust the segment, substantially as and for the purpose set forth.

21. In a type-writing machine, the combination with a support adapted to be oscillated by finger-key mechanism, a type-carrier adjustably mounted thereon, a plurality of finger-key levers, and means for revolubly and axially adjusting said type-carrier, under the action of said key-levers; of a flange and ratchet at the base of the type-carrier, an oscillating rack having notches between its teeth and mounted on the type-carrier support, and means for oscillating said rack during an impressing movement to engage one of its notches over the type-carrier flange, and simultaneously bring one of its teeth between two of the ratchet-teeth, for the purpose of securing accurate adjustment of the type-carrier at the moment of impression, substantially as described.

22. In a type-writing machine, the combination with a support adapted to be oscillated by an impression-link under the action of finger-key mechanism, a type-carrier adjustably mounted thereon, a plurality of finger-key levers, and means for revolubly and axially adjusting said type-carrier, under the action of said key-levers; of a flange and ratchet at the base of the type-carrier, an oscillating rack having notches between its teeth and mounted on the type-carrier support, a spring tending to keep the rack normally outward against a stop on the support, a pin on the oscillating rack, and an antifriction-roller on an arm forming part of the impression-link, said roller being adapted to engage said rack-pin, when an impressing movement is made, and to thereby oscillate the rack and bring one of its notches over the type-carrier flange, and simultaneously one of its teeth between two of the ratchet-teeth, for the purpose of securing accurate adjustment of the type-carrier at the moment of impression, substantially as described.

23. In a type-writing machine having an adjustable type-carrier mounted on a support adapted to be oscillated by finger-key mechanism to make an impression of a selected type character, the combination of an inking-roller having means for yieldingly holding the same in the type-carrier path above the printing-line with its axis of rotation disposed across said printing-line, and a type-carrier having an elongated sleeve-like form adapted to facilitate the inking process of said roller, said type-carrier being disposed above the platen and said means for holding the inking-roller being supported in front of the platen; whereby view of the writing at the moment of printing is but little obscured, substantially as described.

24. In a type-writing machine; an inking mechanism comprising an inking-roller revolubly mounted at the end of a nearly horizontal inking-arm forming part of an elbow-lever, a vertical pintle on which said elbow-lever is pivotally mounted, a hollow post receiving revolubly within it said pintle, a stop on said post to be engaged by the depending arm of the elbow-lever and a spring tending to turn the lever and pintle to yieldingly hold the depending arm against the stop and raise the inking-arm to bring the inking-roller normally in the path of the printing character, substantially as described.

25. In a type-writing machine; an inking mechanism comprising an inking-roller revolubly mounted at the end of a nearly horizontal inking-arm forming part of an elbow-lever, a vertical pintle on which said elbow-lever is pivotally mounted, a hollow post receiving revolubly within it said pintle, a staple on said post to be engaged by a depending arm forming part of the elbow-lever, a spring on said post tending to turn the lever and pintle to yieldingly hold the depending arm against the staple and raise the inking-arm to bring its inking-roller normally in the path of the printing character, the depending arm of the lever where it reacts on the staple being curved slightly so that the point of contact may roll away from the lever-pivot as the inking-arm is pressed down, substantially as described.

26. In a type-writing machine; the combination of an inking-roller revolubly mounted on a pin on an inking-arm, and a latch pivotally mounted on the inking-arm to turn stiffly and retain the roller on the arm in a removable manner, the axis of said roller and pin being disposed longitudinally of the inking-arm and said latch having a form and disposition adapted to keep the roller out of contact with the writing-paper, substantially as described.

27. In a type-writing machine; a shift-key mechanism for changing the field of type in operation for other fields, comprising means for changing the fields, shift-levers adapted to actuate said means, a hanging latch on the forward end of each shift-lever, said latch bearing a double finger-piece on its upper end, and having its forward and backward edges notched, and a pin on the main frame adapted to intercept the shoulder of either notch according as finger-pressure is applied on the finger-piece to retain the latch vertical during the depression, or applied forward of the pivot to rock the key and swing the latch across said pin at the moment of depression, substantially as described.

28. In a type-writing machine, the combination with the shift-levers of a hanging latch O on the forward end of each lever having its forward and backward edges notched at $o^6$ $o^5$, double finger-piece $o'$ on said latch, pin $o$ on the main frame adapted to be engaged by either notch to limit the movement of the lever to a different extent as required and to retain the lever in its depressed position, and a pin $o^3$ on the shift-lever engaging in a perforation in the latch to limit the edgewise movement of the latter, substantially as described.

29. In a type-writing machine, the combination with a spacing-finger, of a printing-point indicator $u^3$ secured thereto, and adapted to be withdrawn thereby from the path of the type-carrier and below the printing-line, when the type-carrier makes a printing movement, substantially as described.

In witness whereof I have hereunto signed my name, this 5th day of July, 1902, in the presence of two subscribing witnesses.

J. L. CANTELO.

Witnesses:
JOHN McLACHLAN,
ALBERT C. B. HENRI.